(12) United States Patent
Perycz et al.

(10) Patent No.: US 7,181,746 B2
(45) Date of Patent: Feb. 20, 2007

(54) INITIALIZATION, RECONFIGURATION, AND SHUT DOWN OF A MODULE FUNCTION

(75) Inventors: Krzysztof S. Perycz, Chmielno (PL); Bohdan T. Iwanojko, Gdansk (PL); Adam Kamiński, Gdansk (PL); Jaroslaw Kogut, Gdansk (PL); Mariusz Oriol, Gdynia (PL); Zbigniew Przekop, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 09/895,936

(22) Filed: Jun. 29, 2001

(65) Prior Publication Data

US 2003/0005273 A1 Jan. 2, 2003

(51) Int. Cl.
*G06F 13/00* (2006.01)
*G06F 15/177* (2006.01)

(52) U.S. Cl. .......................................... 719/310; 713/1

(58) Field of Classification Search ................ 719/320, 719/310; 713/1; 711/5
See application file for complete search history.

(56) References Cited

U.S. PATENT DOCUMENTS

| | | | |
|---|---|---|---|
| 5,210,859 A * | 5/1993 | Aoshima et al. | 714/46 |
| 5,794,231 A | 8/1998 | Li et al. | |
| 5,890,208 A * | 3/1999 | Kwon | 711/112 |
| 6,008,805 A | 12/1999 | Land et al. | |
| 6,128,656 A | 10/2000 | Matchefts et al. | |
| 6,343,352 B1 * | 1/2002 | Davis et al. | 711/158 |
| 6,560,609 B1 * | 5/2003 | Frey et al. | 707/103 R |

* cited by examiner

*Primary Examiner*—William Thomson
*Assistant Examiner*—LeChi Truong
(74) *Attorney, Agent, or Firm*—Blakely, Sokoloff, Taylor & Zafman LLP

(57) ABSTRACT

The present invention is in the field of embedded systems. More particularly, some embodiments initialize, reconfigure, and shut down a module function to provide a unified solution for software development.

21 Claims, 8 Drawing Sheets

INITIALIZATION, RECONFIGURATION, AND SHUT DOWN OF A MODULE FUNCTION

FIELD OF INVENTION

The present invention is in the field of embedded systems software engineering. More particularly, the present invention provides a method, apparatus, system, and machine-readable medium to perform orderly initialization, reconfiguration, and shut down of a software module being a piece of an embedded system.

BACKGROUND

Embedded systems are present in specialized computing devices, such as various turnkey products including, but not limited to, network components like nodes for switches, routers and gateways. Software building blocks of such embedded systems are known as modules. A module may implement some specific functionality. A module's behavior can be determined by a set of module configuration parameters. The parameters may be preserved in some form of non-volatile storage to be available after device power down/power up cycle. The saved parameters can be accessed and used to initialize modules during device start-up.

An operator issuing configuration change requests via some form of management interface may change them later at run-time and save. Modules in a device may not be not totally independent—some modules may use services provided by other modules. Therefore, during initialization, reconfiguration and shutdown the modules have to be acted upon in a proper sequence, as implied by the aforementioned dependencies. For example, a routing protocol like Open Shortest Path First (OSPF) operating in an OSPF module, needs Internet Protocol (IP) stack operating in an IP stack module. Consequently, for initialization and reconfiguration, IP stack module parameters may be set before OSPF module parameters are set, so the IP stack module may become active before the OSPF module becomes active. During shutdown, an inverted sequence may be needed: the OSPF module can shut down first, followed by the IP stack module. In this way, OSPF may send packets informing other network devices that it is about to de-activate via the IP stack module. In consequence, other network nodes may adjust their topology databases without disrupting network operation, which may otherwise happen when a network node simply disappears without any warning.

In embedded systems, the initialization and shutdown functions may be improperly structured, which results in lots of redundant coding and difficulties in reusing the code in different products. Initialization code can be combined with initial configuration routines, specifically coded to handle some format of registry or INI file, holding configuration parameters. When the format changes, the whole initialization code may have to be rewritten. Initialization and shutdown sequences may be hardcoded, so it is difficult to reuse the code on different products using different set of features (modules tend to be tightly coupled with such an arrangement). Initial configuration and run-time reconfiguration may be performed with a different code, which adds redundancy, increases testing complexity and can be generally error-prone. There is no general mechanism for ensuring a correct sequence of actions on initialization and shutdown.

BRIEF FIGURE DESCRIPTIONS

The accompanying drawings, in which like references indicate similar elements, show:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
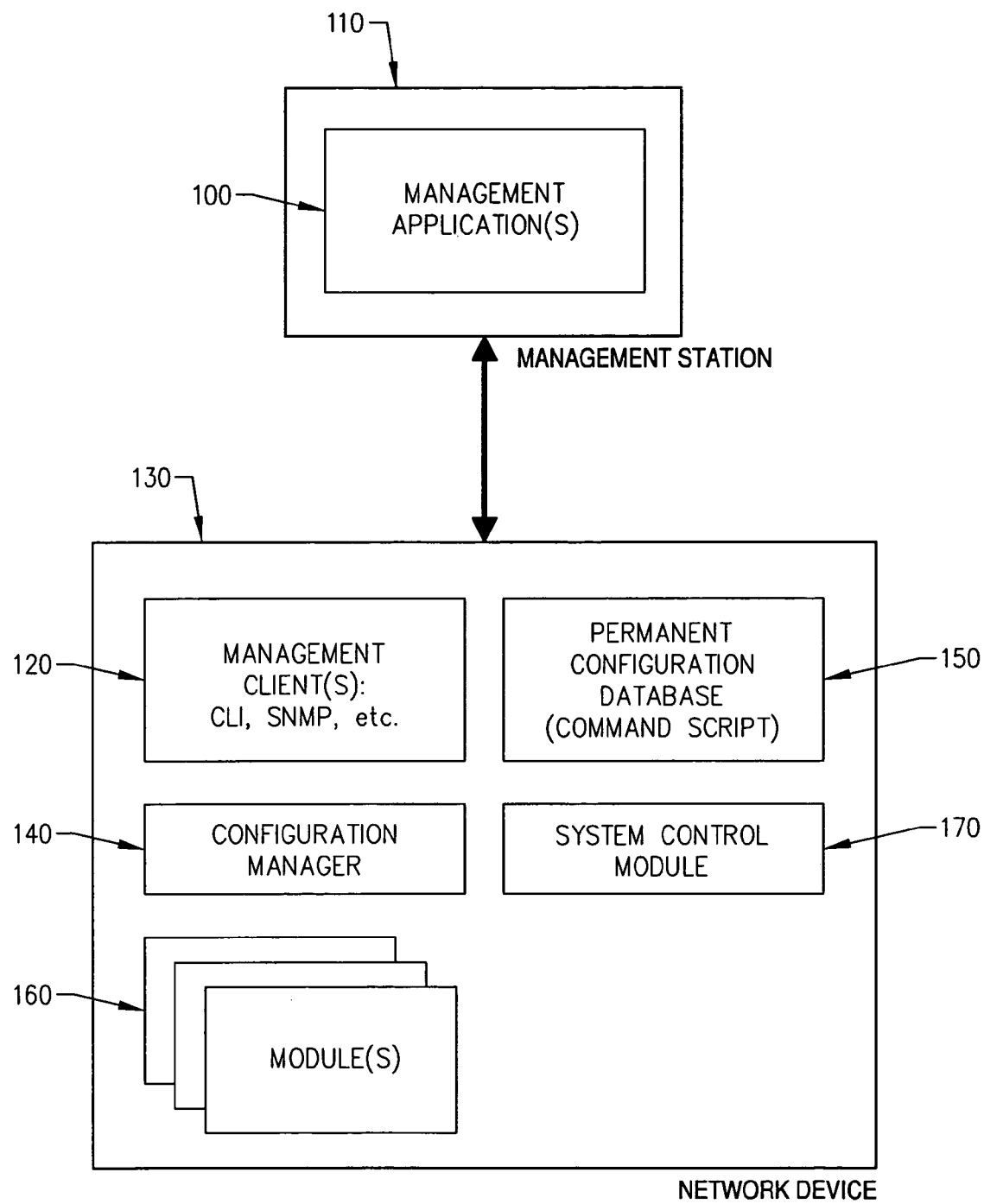
FIG. 1 depicts a high-level block diagram of a network system including an embedded system software application.

As described above, referring to FIG. 1, an embedded systems software application typically comprises one or more modules 160 coupled together on one or more e.g., network devices 130 to provide the overall functionality of the application (and consequently of the network device(s)). A module is thus a configurable piece of embedded systems software implementing a specific functionality. In the proposed arrangement, the modules are typically loosely coupled such that they depend to some extent on each other but a missing or non-enabled related module will not cause a system crash or disruption but merely some degradation of overall functionality of the application.

Further, according to an embodiment of the invention, a network embedded systems software application comprises one or more management applications clients 120 serving one or more management stations 110. A management station is a device in the network from which the various network devices are controlled and configured using the management client(s) 120 and/or configuration manager 140 residing on such devices. Typically, a management station is a workstation on a network and comprises management application software. Such management application software may include Simple Network Management Protocol (SNMP) manager software and/or command-line interface (CLI) terminal software such as Hewlett Packard's OpenView software, Hyper Terminal available as part of the Microsoft Windows operating system software or telnet software.

A management client 120 is a portion of the embedded software on a network device responsible for receiving configuration parameter change or read requests and/or monitored variable read requests from management application(s). The management client(s) passes such requests on for service by appropriate modules in the embedded software via the configuration manager. Typically the management client corresponds with or designed to specifically interoperate with the particular kind of management application used in the network system.

A configuration manager 140 is embedded systems software responsible for relaying change or read requests from the management client(s) originated on the management station(s) to appropriate servicing modules within the embedded system. Such change or read requests are typically GET and SET operations performed on modules "owning" referenced configuration parameter(s) and/or monitored variable(s).

A network device may also comprise a Permanent Configuration Database 150 that includes all permanently stored parameters for the device; the parameters may be stored in any format, including, but not limited to, a command script, XML file, etc. The System Control Module 170 is responsible for execution and coordination of actions connected with device initialization, configuration, configuration saving and device shutdown (all aforementioned actions are described in detail later).

The embedded system of a network device 130 may be built from modules such as management clients 120, configuration manager 140, modules 160, and system control module 170, these modules may be designed to be reusable, to minimize costs of software development effort. In some embodiments, a collection of these modules may be reused as whole or in a part to design a new (perhaps different) specialized computing device. The complexity of this task can depend also on a module framework design. A framework may facilitate construction of the target system from the building blocks and give high degree of software reusability from device to device. In particular, embedded system modules may facilitate: (1) orderly initialization, (2) orderly shutdown, and/or (3) orderly command script generation. Orderly Initialization can comprise coordination of modules' activities because some modules always depend on other. Also, as a part of initialization, modules may be configured using permanently stored parameters (a.k.a. registry) and default values. This process can also be coordinated between modules.

Orderly shutdown may make it possible to achieve so-called graceful shutdown, in which important volatile information may be either preserved (to be available after reboot) or communicated to other active cooperating devices (to react properly). Further, orderly command script generation, when having registry implemented as a console command script, may be important so when the script executes later during initialization, e.g., certain objects can be created before they receive some parameter values.

Many embodiments may specify a structured modularization framework, eliminating or reducing redundant coding and the hardcoded initialization and shutdown sequencing. Some embodiments may also give permanent configuration database (a.k.a. registry or INI file) format independency, so changing the format may not introduce massive code modifications, further promoting code reusability.

Figure 2:
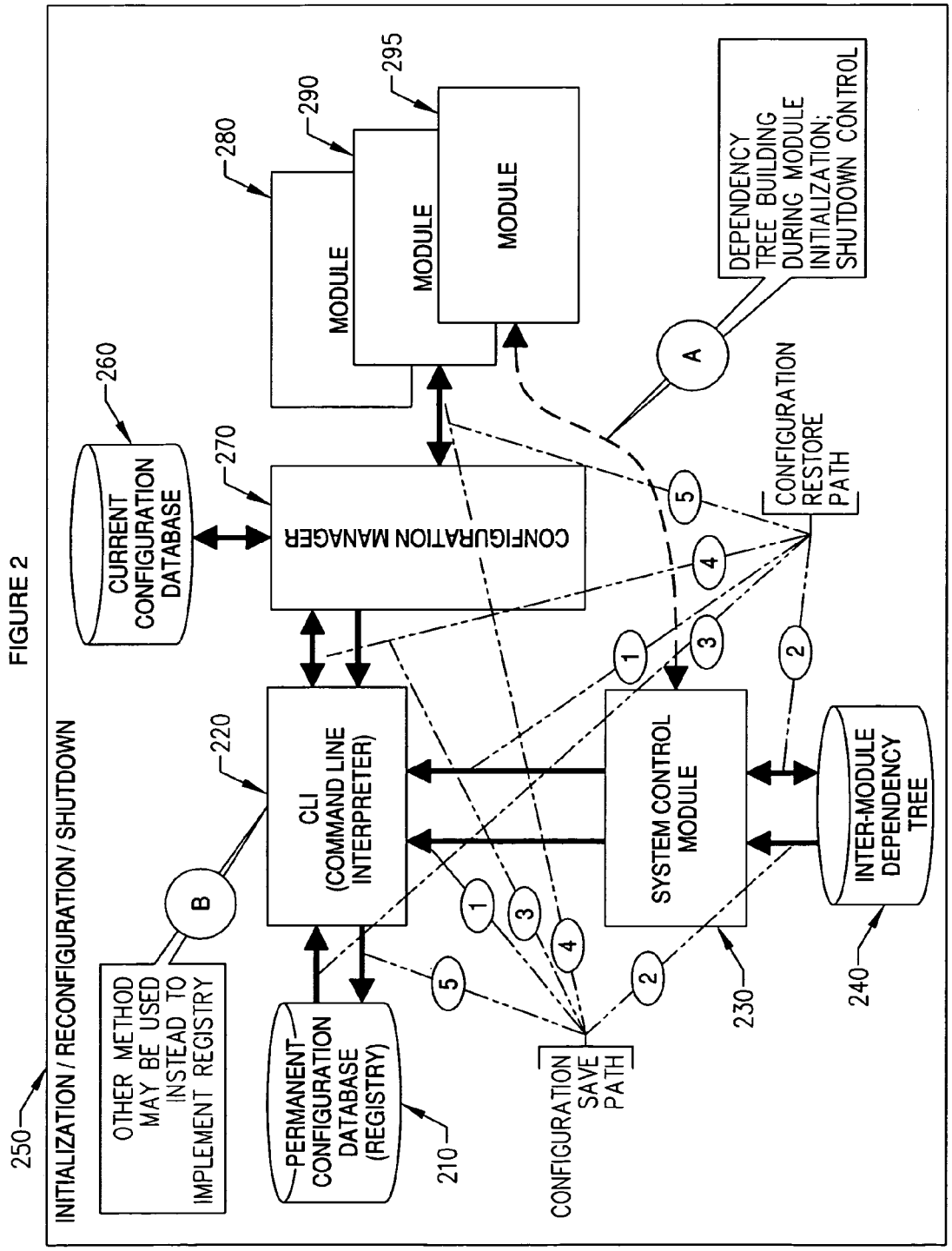
FIG. 2 depicts a node capable of changing a module function.

Referring now to FIG. 2, there is shown a node 250 capable of changing a module function. The node 250 may comprise a permanent configuration database (a.k.a. registry) 210, a command line interpreter (CLI) 220, a system control module 230, an inter-module dependency tree 240, a configuration manager 270, a current configuration database 260, and modules 280, 290, and 295. The permanent configuration database 210 may be placed in a permanent data storage device such as a hard drive or a Flash memory and store configuration parameters for modules of node 250. The CLI 220 may either be used to generate configuration change requests based on the permanent configuration database 210.contents (on initialization), or to generate a configuration script based on the Current Configuration Database 260 to be subsequently placed in Permanent Configuration Database 210 (on configuration save).

The system controller, a system control module 230 in the present embodiment, can be a module responsible for controlling all other modules in an embedded system. The system control module 230 may be responsible for a proper system initialization and shutdown and also for ensuring a proper sequence of generated command script. The system control module 230 can build an inter-module dependency tree 240, a database, in random access memory (RAM) based on information gathered from modules 280, 290, and 295, which can register with the system control module 230 at the first step of their initialization. The system control module 230 may use this database to enforce a correct initialization sequence to modules 280, 290, and 295. The inter-module dependency tree 240 may also be used during shut down of modules 280, 290, and 295 to perform the shut down in an opposite sequence as compared to initialization. The system control module 230 may also initiate initialization script generation by instructing the CLI 220 to generate commands corresponding to the parameters present in the Current Configuration Database 260, and then store the resulting script in permanent configuration database 210.

Figure 3:
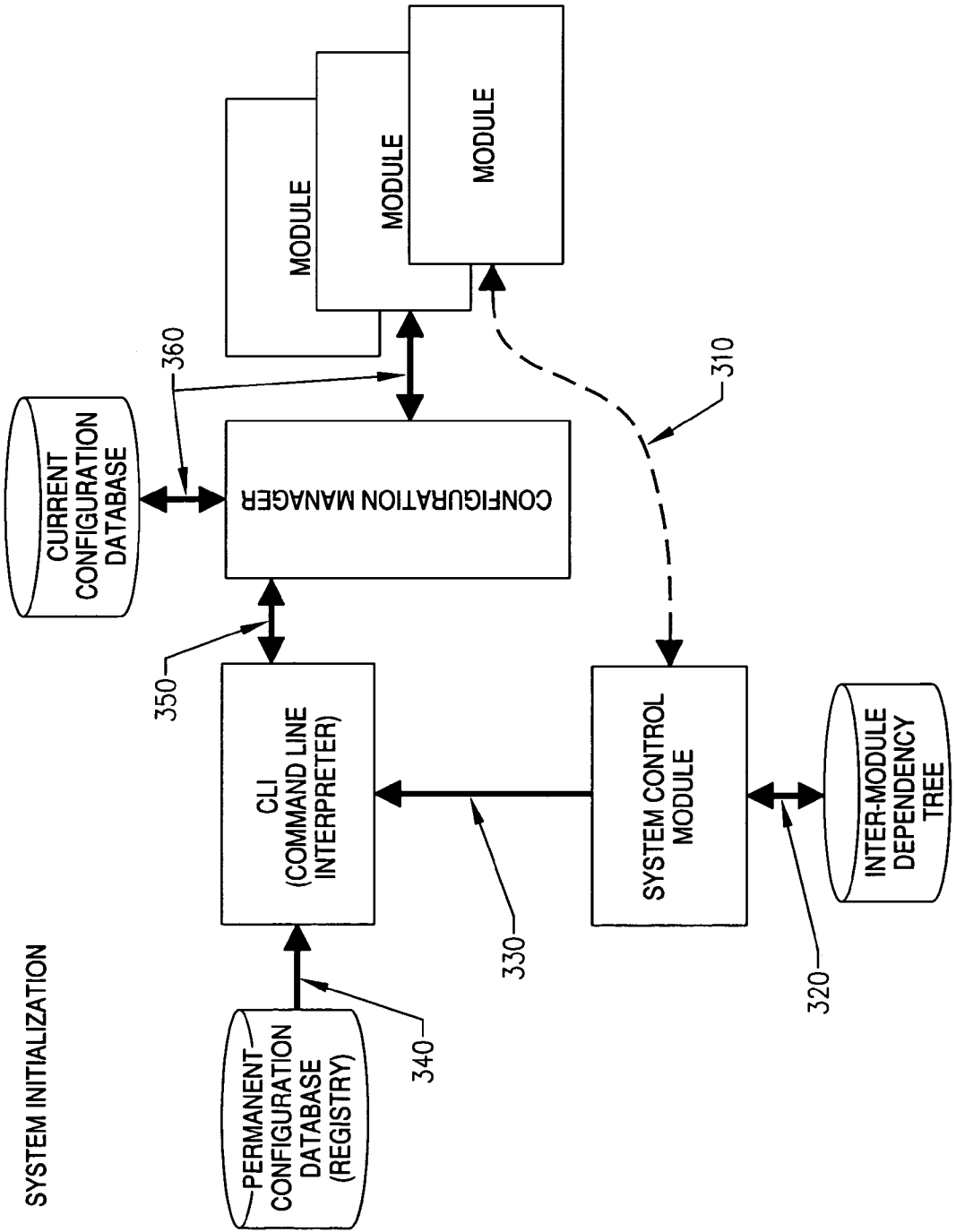
FIG. 3 depicts system initialization.

FIG. 3 shows an example of events during system initialization. After loading an embedded system into a computing device, the system control module may be initialized. All other system modules may register 310 with system control module, giving their requirements on initialization, by specifying initialization steps and relationships to other modules. At this time, the modules may also register commands with CLI 360 and 350. CLI may assign a phase identification (Id) to each command. The initialization steps may include e.g., a resource allocation step, an initialization of used libraries, and an initialization of management interface (CLI, SNMP, etc.). Further, the relationships can define dependencies to other system modules, e.g., IP stack has to be initialized before OSPF router software. Based on registration information, the system control module may determine an inter-module dependency tree 320. The system control module may use the inter-module dependency tree 320 to complete initialization 330, 350, and 360, perform device shutdown 330, 350, and 360, and ensure a proper sequence of generated configuration script 330 and 340. As the last step, each module configuration may be restored as a result of the following actions: (1) batch CLI session is started 330; (2) a sequence of phase Ids may be taken for each module 330; (3) from the command script 340, the commands matching given phase Id can be executed 350; (4) configuration manager can pass new parameters value to the current configuration database 360, and (5) the new parameters are passed to owning modules 360.

Figure 4:
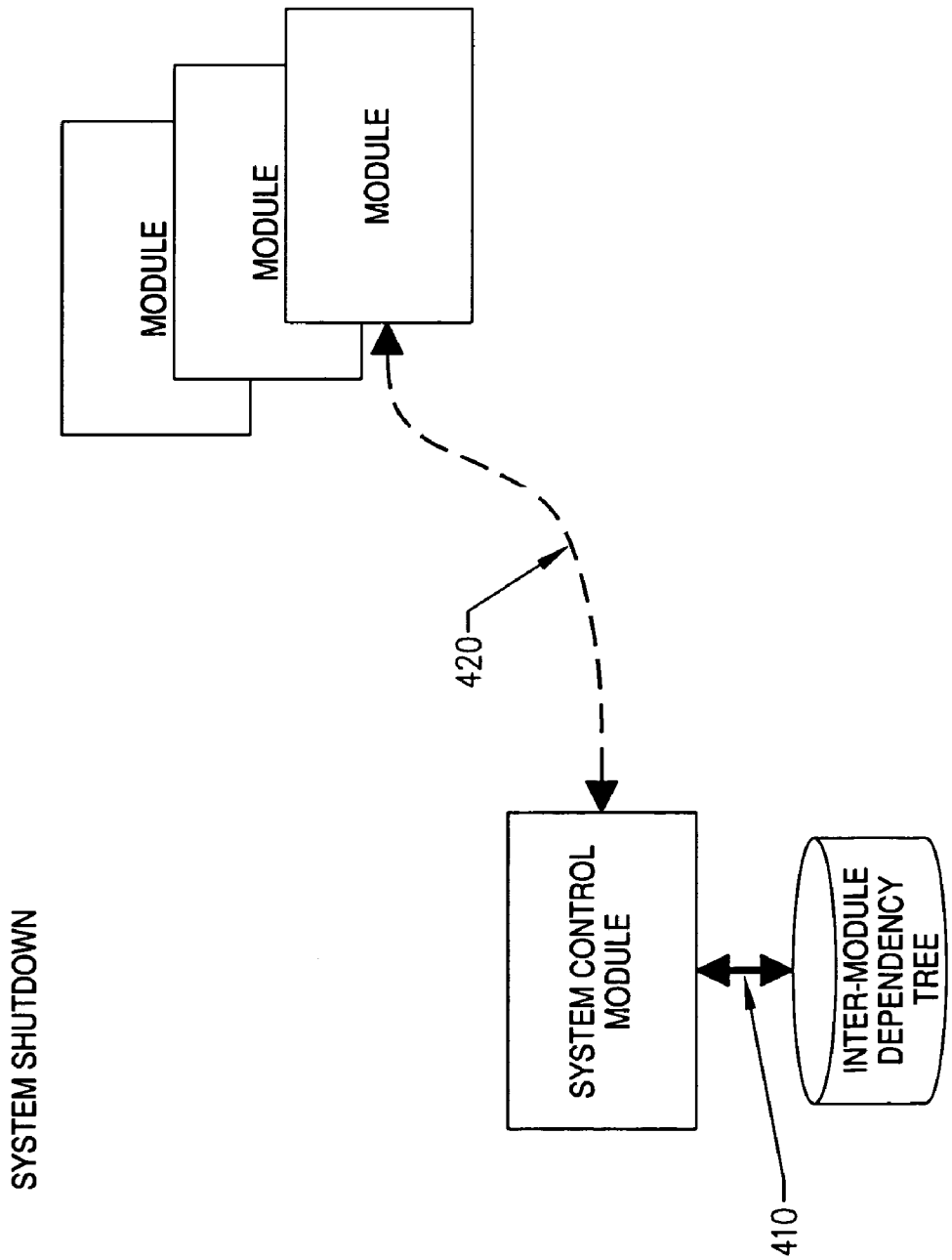
FIG. 4 depicts system shutdown.

FIG. 4 shows example actions and elements involved in device shutdown. Using the inter-module dependency tree 410, the system control module may determine a proper shutdown sequence for all modules within an embedded system and trigger self-destruction actions in the modules 420. As a result of such action, each module may send notification(s) to any interested parties that its service is being terminated and then may release all used resources and stop.

Figure 5:
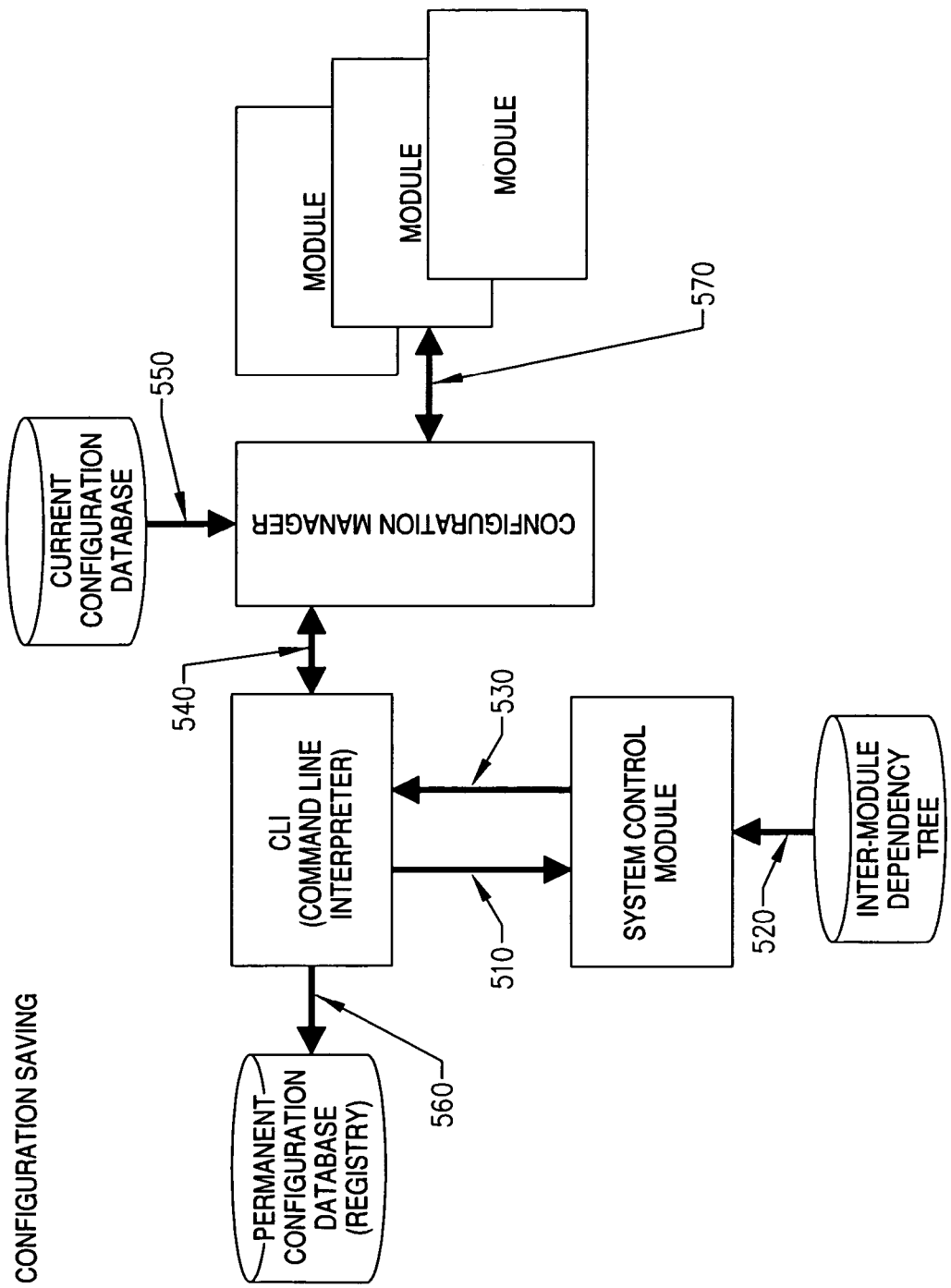
FIG. 5 depicts configuration saving.

FIG. 5 illustrates example configuration save actions and some involved embedded system elements. A system configuration may be changed at any time while a device is operating. This configuration change can be regarded as temporary, unless an operator explicitly saves it. If the configuration after altering is not saved, the new configuration will disappear during the next system reboot (and the device will start with a previously saved configuration). The 'temporary' or 'current' configuration is held in current configuration database (located in RAM); the saved or 'permanent' configuration may be kept in permanent configuration database (located on a non-volatile storage, typically Flash memory or a hard disk). In order to optimize space on the non-volatile media, only those parameters, which are different from defaults, may be saved. The sequence of actions is as follows: the system control module may initiate the operation 530 and then: (1) CLI script generation session can start 530; (2) for each module a sequence of phase Ids may be requested by CLI 510 and can be taken from the inter-module dependency tree 520; (3) parameters matching given phase Id may be retrieved from the current configuration database 550 via configuration manager 540; (4) a default parameter value may be taken from an owning module 570; (5) an equivalent console command can be emitted (if the parameter differs from the default value) and saved 560 on permanent configuration database.

Figure 6:
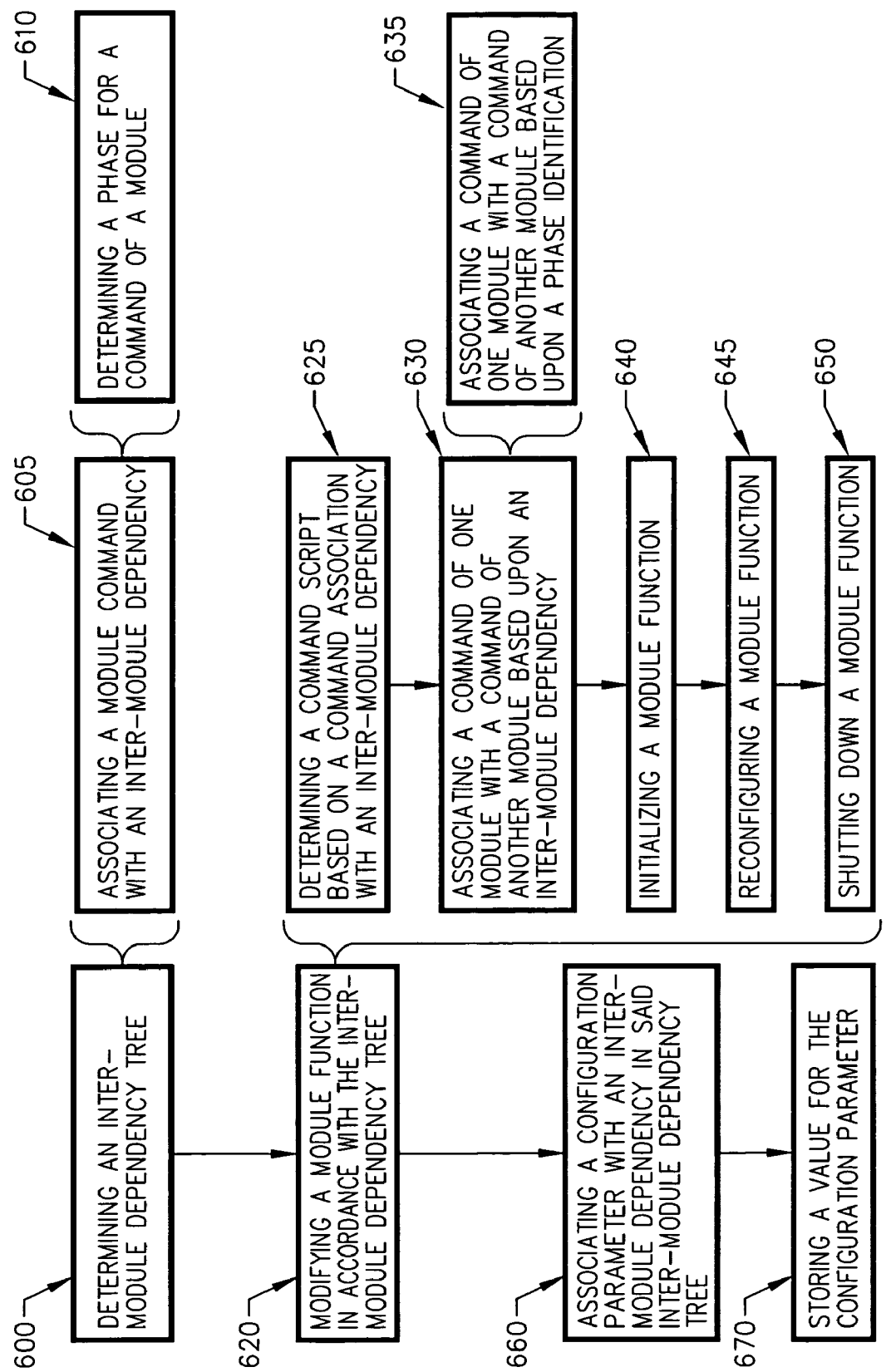
FIG. 6 depicts a flow chart to change a module function.

Referring now to FIG. 6, there is shown a flow chart to change a module function. The flow chart may comprise determining an inter-module dependency tree 600, modifying a module function in accordance with the inter-module dependency tree 620, associating a configuration parameter with an inter-module dependency in said inter-module dependency tree 660, and storing a default value for the configuration parameter 670. Determining an inter-module dependency tree 600 may initiate a transaction requesting information to a configuration manager of a node to obtain inter-module dependencies for modules within the node. In other embodiments, determining an inter-module dependency tree 600 can comprise modules registering with a system controller. In some nodes, a module handling servicing of configuration parameters for modules of the node may track information about inter-module dependencies and store the information in a MDL.

Determining an inter-module dependency tree 600 can comprise associating a module command with an inter-module dependency 605. Associating the module command with an inter-module dependency 605 may comprise associating a transaction to modify a configuration parameter of a module with a dependency on a configuration parameter of a second module. In some embodiments, associating a module command with an inter-module dependency 605 can comprise storing an association between the module command and the inter-module dependency in a permanent configuration database or storing the command or reference to the command in a data structure that may imply an association.

Associating a module command with an inter-module dependency 605 can comprise determining a phase for a command of a module 610. Determining a phase for a command of a module 610 may identify a sequence for the command in an initialization, reconfiguration, and/or shut down process and associate the phase with the command. Associating a phase with a command can determine commands that may be executed in parallel when a phase is associated with more than one command.

Modifying a module function in accordance with the inter-module dependency tree 620 may initialize, reconfigure, or shut down a function in a module of a node in a manner that maintains global consistency. Maintaining global consistency can comprise modifying configuration parameters in a sequence such that configuration parameters of a module that depend upon configuration parameters of a second module are not inconsistent with the configuration parameters of the second module. Modifying a module function in accordance with the inter-module dependency tree 620 may comprise determining a command script based on a command association with an inter-module dependency 625, associating a command of one module with a command of another module based upon an inter-module dependency 630, initializing a module function 640, reconfiguring a module function 645, and shutting down a module function 650.

Determining a command script based on a command association with an inter-module dependency 625 may generate a command console script for a command of a module and associate that command console script with a phase. In some embodiments a command line interface may generate the command console script. Associating a command of one module with a command of another module based upon an inter-module dependency 630 may comprise associating a command of one module with a command of another module based upon a phase identification 635. Associating a command of one module with a command of another module based upon a phase identification 635 may facilitate command console script generation for initialization, reconfiguration, and shut down processing. The phase identification may comprise a tag indicating the phase of initialization, reconfiguration and shut down as determined from an inter-module dependency tree.

Initializing a module function 640 may configure a module to perform its primary function and can comprise initiating a transaction comprising a module command. In many embodiments, initializing a module function may comprise executing one or more command console scripts associated with a first phase identification then executing one or more command console scripts identified with subsequent phase identifications.

Reconfiguring a module function 645 may comprise initiating the same command transactions in the same sequence as initializing a module function 640. In some embodiments, reconfiguring a module function 640 can comprise executing command console script to initialize a module, or a portion thereof. Reconfiguring a module function 645 can change the operation of a function in a module. For example, the speed that a first node transmits packages to a second node may be increased by reconfiguring the routing module for the first node.

Shutting down a module function 650 may issue a command to a module in a sequence based on a phase relationship of the command and a second command to shut down a routing protocol for a node and the routing protocol may not be available until it is initialized or reconfigured. Shutting down a module function 650 may comprise executing one or more command console scripts in an order based upon phase identifications that are opposite the order of phase identifications used for initializing a module function 640.

Associating a configuration parameter with an inter-module dependency in said inter-module dependency tree 660 may comprise storing a value for a configuration parameter of a function of a module in a permanent configuration database. For example, a configuration manager may receive a configuration parameter change request from a management workstation, effect the configuration parameter change request in the run time variables of a module, store the new configuration parameter values in a current configuration database, and transmit the new configuration parameters along with a reference to the function modified in a module to a permanent configuration database via a CLI. The CLI may store the new configuration parameters for the function in a permanent configuration database and associate that new configuration parameter with a command or command console script designed to modify the configuration parameter during initialization, reconfiguration and shut down of that module function.

Storing a default value for the configuration parameter 670 may store a default value for a configuration parameter in the permanent configuration database. In some embodiments, the default value for the configuration parameter may be stored when command console scripts for that configuration parameter is stored in the permanent configuration database. Modules of the CLI may determine when a default value for a configuration parameter may be used.

In alternate embodiments, the CLI may associate configuration parameters with phases for initialization, reconfiguration and shut down processes. In further embodiments, remote management workstations may forward configuration parameter change requests to the node and the reconfiguration code or command console script of the node can effect the modifications to the module function.

Figure 7:
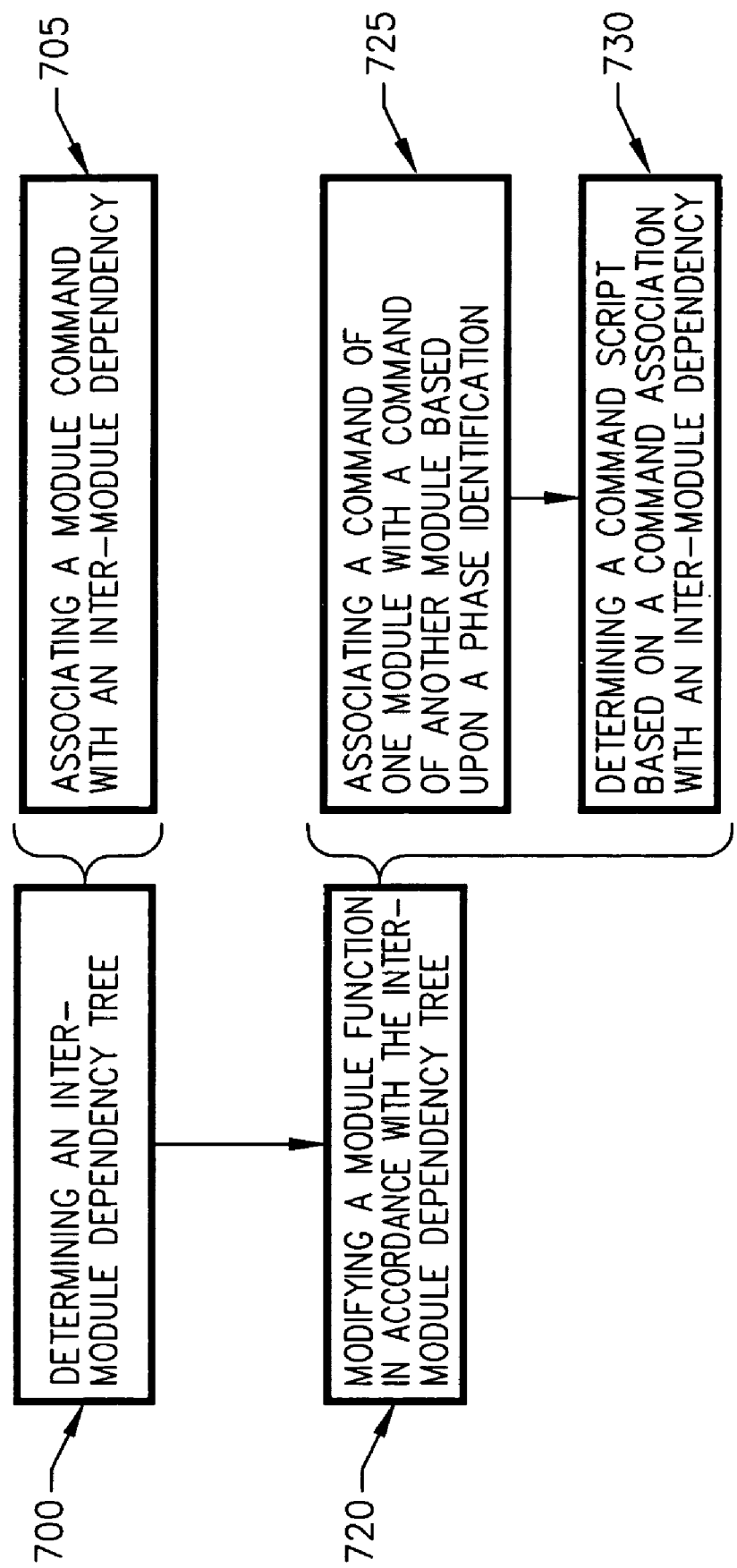
FIG. 7 depicts another flow chart to change a module function.

Referring now to FIG. 7, there is shown another flow chart to change a module function. The flow chart may comprise determining an inter-module dependency tree 700 and modifying a module function in accordance with the inter-module dependency tree 720. Determining an inter-module dependency tree 700 may initiate transactions to determine inter-module dependencies of modules within the node. Determining an inter-module dependency tree 700 can comprise associating a module command with an inter-module dependency 705. Associating a module command with an inter-module dependency 705 may place commands of modules in a structure indicating inter-module dependency. For instance, a first command may be received that has no command dependent upon it and it is placed in a first row. A second command may be received that command one is dependent upon so the second command may be placed in a second row. A third command may be received that has no dependencies upon it so the third command may be stored next to the first command in the first row. Finally, a fourth command may be received that the second command is dependent upon so the fourth command may be stored in a fourth row.

Modifying a module function in accordance with the inter-module dependency tree 720 may modify configuration parameters for a module function by initiating module commands in a sequence based upon the inter-module dependency tree. Modifying a module function in accordance with the inter-module dependency tree 720 may comprise associating a command of one module with a command of another module based upon a phase identification 725. For example, command one in a first row may be associated with tag 10, command two in a second row may be associated with tag 20, command three in the first row may be associated with tag 10, and command four in the third row may be associated with tag 20. When modifying a module function in accordance with the inter-module dependency tree 720 comprises initializing or reconfiguring using commands one through four, command one and three may be executed first, command two may be executed second, and command four may be executed third. On the other hand, when modifying a module function in accordance with the inter-module dependency tree 720 comprises shutting down the functions represented by commands one through four, command four may be executed first, command two may be executed second and commands three and one may be executed last.

Determining a command script based on a command association with an inter-module dependency 730 may comprise auto-generating command script to initiate a transaction comprising a command in a sequence based upon the inter-module dependency and may comprise initiating a transaction to instruct a CLI to associate a command console script with a phase identification.

Figure 8:
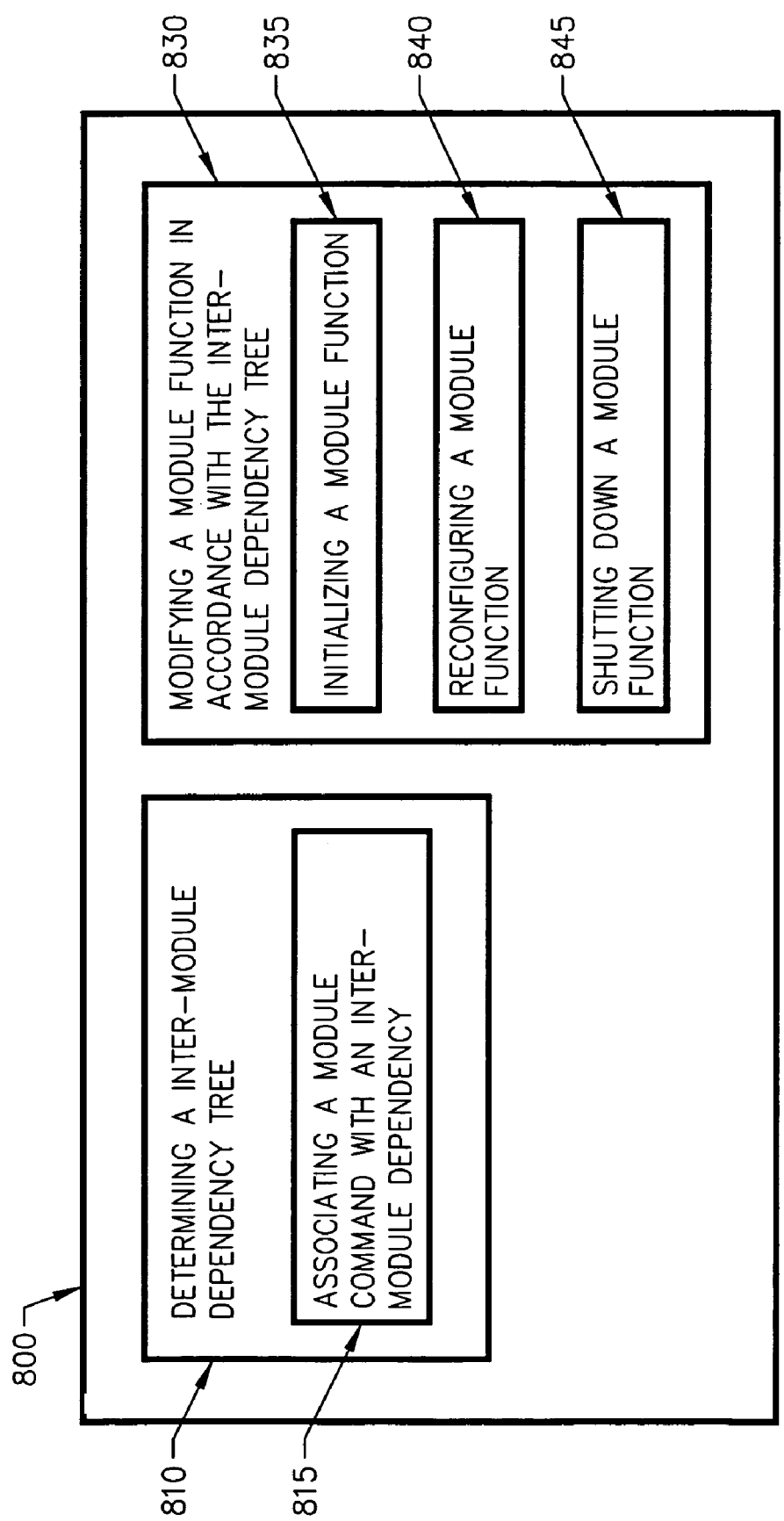
FIG. 8 depicts a machine-readable medium comprising instructions to change a module function.

Referring now to FIG. 8, a machine-readable medium embodiment of the present invention is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . . Several embodiments of the present invention can comprise more than one machine-readable medium depending on the design of the machine.

The machine-readable medium 800 may comprise instructions for determining an inter-module dependency tree 810 and modifying a module function in accordance with the inter-module dependency tree 830. Determining an inter-module dependency tree 810 can comprise instructions for associating a module command with an inter-module dependency 815. Associating a module command with an inter-module dependency 815 may comprise instructions to build one or more trees comprising each module command associated with a node. In some embodiments, one or more inter-module dependency trees may be created and may not be associated with each other. Many embodiments comprise a module dependency tree associated with each module registered with a system controller. In some embodiments, the lowest member or members of each tree are associated with a phase for initialization and reconfiguration and the highest member or members are associated with a phase for shut down.

Modifying a module function in accordance with the inter-module dependency tree 830 may comprise instructions for initializing a module function 835, reconfiguring a module function 840, and shutting down a module function 845. In some embodiments, instructions for initializing a module function 835 and reconfiguring a module function 840 can comprise the same or a portion of the same code or command console script. Initializing a module function 835 may comprise instructions to initialize module commands in a sequence beginning with the lowest member of an inter-module dependency tree. In alternative embodiments, initializing a module function 835 may comprise instructions for initiating one or more transactions based upon command console script or code and upon one or more trees of the inter-module dependency tree. Similarly, reconfiguring a module function 840 can comprise instructions for initiating transactions to modify configuration parameters of a function in a sequence based upon one or more trees in the inter-module dependency tree.

Shutting down a module function 845 may remove a function of a node from service. In addition, a graceful shut down may initiate an alternative module to perform a similar function. For example, shutting down a module function 845 can comprise instructions for transmitting commands to a node to create a port, initiate a routing module, routing protocol module, and gateway protocol module as well as commands to shut down a gateway protocol module, routing protocol module, and routing module.

What is claimed is:

1. A method, comprising:
   receiving requirements for a plurality of modules;
   determining an inter-module dependency tree using a system controller, the inter-module dependency tree being based on the requirements; and
   modifying a module function in accordance with the inter-module dependency tree using the system controller, wherein modifying a module function is a modification selected from the group consisting of initializing the module function in accordance with the inter-module dependency tree. reconfiguring the module function in accordance with the inter-module dependency tree, and shutting down the module function in accordance with the inter-module dependency tree.

2. The method of claim 1 further comprising associating a configuration parameter with an inter-module dependency in the inter-module dependency tree.

3. The method of claim 1 further comprising storing a default value for a configuration parameter.

4. The method of claim 1 wherein determining an inter-module dependency tree comprises associating a module command with an inter-module dependency.

5. The method of claim 4 wherein associating a module command with an inter-module dependency comprises determining a phase for a command of a module.

6. The method of claim 1 wherein modifying a module function comprises determining a command script based on a command association with an inter-module dependency.

7. The method of claim 1 wherein modifying a module function comprises associating a command of a first module with a command of a second module based upon an inter-module dependency for the first module and the second module.

8. The method of claim 7 wherein associating the command of the first module with a command of the second module comprises associating the command of the first module with the command of the second module based upon a phase identification.

9. An apparatus, comprising:
   a system controller, the system controller comprising circuitry to store an inter-module dependency tree, the inter-module dependency tree being based on requirements for a plurality of modules, the system controller to modify a module function in accordance with the inter-module dependency tree, the system controller further comprising circuitry to modify a module function in accordance with an inter-module dependency tree; and
   a configuration manager coupled to the system controller;
   wherein modification of a module function in accordance with the inter-module dependency tree by the system controller is a modification selected from the group consisting of an initialization of the module function, a reconfiguration of the module function, and a shut down of the module function.

10. The apparatus of claim 9, further comprising a current configuration database coupled to the configuration manager, the current configuration database containing one or more configurations for the plurality of modules that are not retained when the apparatus is initialized.

11. The apparatus of claim 9, further comprising a permanent configuration database coupled to the configuration manager via a command line interface, the permanent configuration database containing one or more configurations that are retained when the system is initialized.

12. The apparatus of claim 9, wherein the configuration manager comprises circuitry to receive a configuration parameter change request.

13. The apparatus of claim 9, wherein the configuration manager comprises circuitry to modify a module function in accordance with a configuration parameter change request.

14. A system, comprising:
   a network component comprising a system controller coupled to a configuration manager;
   a component coupled with the system controller to store an inter-module dependency tree, the inter-module dependency tree being based on requirements for a plurality of modules, the system controller to modify a module function in accordance with the inter-module dependency tree; and
   a station coupled to the network component;
   wherein the modification of a module function in accordance with the inter-module dependency tree by the system controller is a modification selected from the group consisting of an initialization of the module function, a reconfiguration of the module function, or a shut down of the module function.

15. The system of claim 14, wherein the system further comprises a permanent configuration parameter database coupled to the configuration manager via a command line interface, the permanent configuration database containing one or more configurations that are maintained when the system is rebooted.

16. The system of claim 14, wherein the station comprises a server to forward a transaction via the network component.

17. The system of claim 14, wherein the station comprises a management workstation to configure said network component.

18. A machine-readable medium containing instructions, which when executed by a machine, cause the machine to perform operations, comprising:
   receiving requirements for a plurality of modules; determining an inter-module dependency tree using a system controller, the inter-module dependency tree being based on the requirements; and
   modifying a module function in accordance with the inter-module dependency tree using the system controller, wherein modifying a module function is a modification selected from the group consisting of initializing the module function in accordance with the inter-module dependency tree, reconfiguring the module function in accordance with the inter-module dependency tree, and shutting down the module function in accordance with the inter-module dependency tree.

19. The machine-readable medium of claim 18 wherein determining an inter-module dependency tree comprises associating a module command with an inter-module dependency.

20. The machine-readable medium of claim 18 wherein modifying the module function comprises reconfiguring a module function in accordance with the inter-module dependency tree.

21. The machine-readable medium of claim 18 wherein modifying a module function comprises shutting down the module function in accordance with the inter-module dependency tree.

* * * * *